(No Model.)

F. SHIPPEN.
LIQUID METER.

No. 508,774. Patented Nov. 14, 1893.

Witnesses:
John Becker,
L. M. Hachschlager.

Inventor:
Francis Shippen,
by his attorneys
Briesen & Knauth

UNITED STATES PATENT OFFICE.

FRANCIS SHIPPEN, OF HOBOKEN, NEW JERSEY.

LIQUID-METER.

SPECIFICATION forming part of Letters Patent No. 508,774, dated November 14, 1893.

Application filed December 8, 1892. Serial No. 454,477. (No model.)

*To all whom it may concern:*

Be it known that I, FRANCIS SHIPPEN, residing at Hoboken, Hudson county, and State of New Jersey, have invented an Improved Liquid-Meter, of which the following is a specification, reference being had to the accompanying drawings, forming part hereof, wherein—

Figure 1:
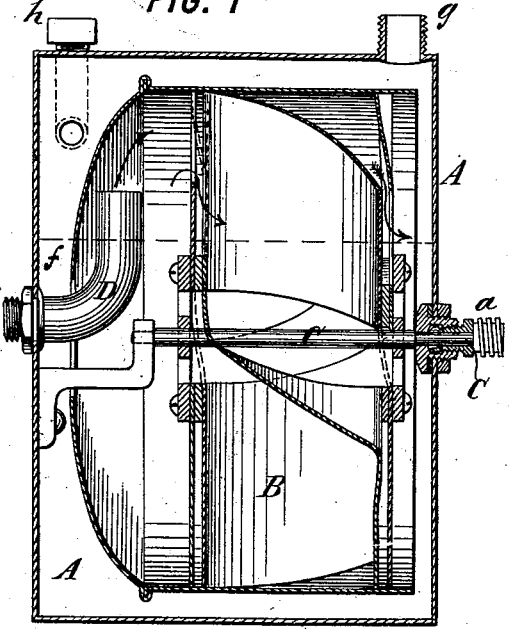
Figure 2:
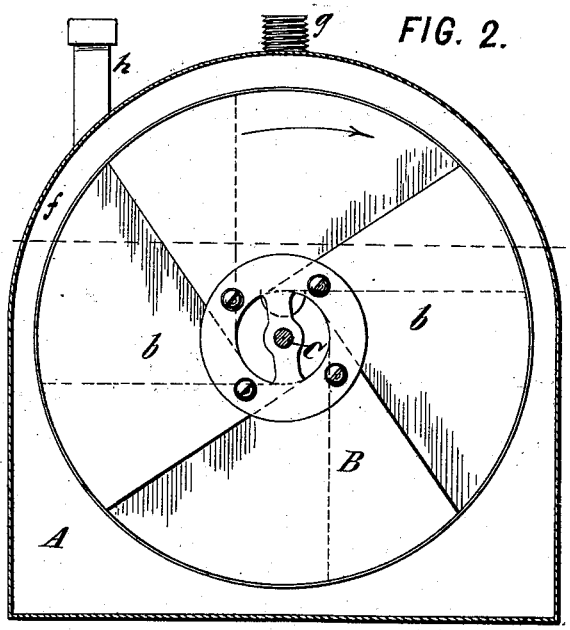
Figure 3:
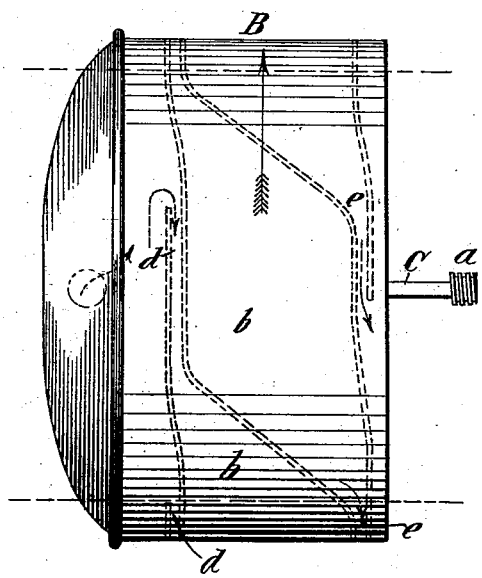
Figure 4:
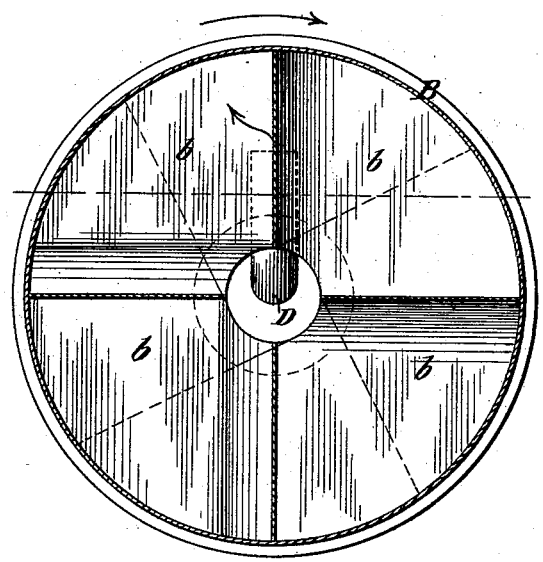

Figure 1 is a vertical central section of my improved liquid meter. Fig. 2 is a rear view of the meter-drum showing the inclosing housing in cross-section. Fig. 3 is a top view of the meter-drum; and Fig. 4 is a vertical section through the body of the meter-drum.

This invention relates to apparatus for measuring oils or liquid hydrocarbons and seeks to utilize the construction of the rotary measuring chamber of ordinary gas-meters for the purpose of measuring oils or liquid hydrocarbons. In ordinary gas-meters having a similar construction the measuring vessel or rotary-drum is submerged to a certain extent (which is to a point slightly above its axis) in water, the water in the lower part of the measuring vessel or drum acting as a sealing liquid, which sealing liquid is disturbed whenever one of the chambers of the measuring vessel above the water is filled with gas, while other chambers also above the water were not filled with gas. It has heretofore been impracticable to utilize this well-known system of gas-meters for the measurement of oils or liquid hydrocarbons, because the liquids to be measured were liable to become admixed with the water in the meter. My invention seeks nevertheless to combine with the general known construction of such meters a sealing liquid which is incapable of admixture with the liquid to be measured.

The invention consists mainly in combining with the rotary measuring drum, subdivided into spirally arranged chambers, and with the outer casing and the necessary inlet and discharge pipes, mercury as a sealing liquid, the mercury taking the place of the water in the old construction of wet gas-meters.

In the accompanying drawings the letter A represents the outer casing of the meter.

B is the inner rotary drum mounted upon a shaft C which has its bearings in the housing or casing A and which by a worm $a$, or otherwise, communicates the rotary motion of the drum B to an index-hand in well-known or suitable manner. The drum B is divided into four, more or less, measuring chambers $b\ b$, whose relative positions are indicated by the dotted lines in Fig. 3, it appearing from these dotted lines that the inlet-opening for each chamber $b$ (which inlet-opening is indicated at $d$ in the drawings) is about opposite the middle of a chamber adjoining the one to which the inlet-opening pertains, while the outlet-opening $e$ of each chamber is also in line with an adjoining chamber to which it pertains, so that in one line drawn across the drum, if looked upon from above, we observe the inlet-opening $d$ of one chamber $b$, the body of the adjoining second chamber $b$, and the outlet-opening $e$ of a third chamber $b$, all as in Fig. 3.

D is the inlet-pipe for the liquid to be measured, said pipe entering the casing A preferably at about a line with the axis of the shaft C, but turned up within the casing A so as to have its discharge mouth at a point above the level of a line marked $f$ in Figs. 1 and 2.

$g$ is the outlet-opening from the case A for the liquid that has been measured.

$h$ is a suitable overflow-pipe on the casing, which may, however, be omitted if desired. All that part of the apparatus which is below the line $f$ is submerged in mercury, which fills the casing and those chambers of the drum B which are below that line, at least up to the height of said line.

When the parts have been combined in manner shown, and after the mercury has been put in up to the line $f$, the naphtha or other liquid to be measured is permitted to flow in through the pipe $d$, and in so doing reaches (supposing the parts to be in the position shown in Fig. 3) one of the open inlets $d$ to one of the chambers $b$. Being under head or pressure, the naphtha entering this chamber $b$, which is partly filled with mercury, displaces the level of the mercury, causing it to descend on the side toward which the naphtha flows, and to ascend on the opposite side and thereby causing the drum to turn in the direction of the arrow which is indicated in Fig. 2, continuing so to turn until the inlet-opening $d$, through which the naphtha was supplied, dips into mercury and becomes sealed. At this time, however, another inlet-opening to the next chamber $b$ is open to the naphtha and permits the liquid to flow into that chamber, and in this manner the rotation of the drum is kept up; with this understanding, however, that whenever the inlet-opening of a chamber dips into mercury, its outlet-opening is above the mercury and discharges the contents of such chamber into the casing A. The rotation of the drum is conformable to the speed with which the different chambers of said drum are filled, and the rotation of the shaft C therefore can be utilized, with the aid of a suitable pointer, to indicate the quantity of liquid passing through the meter.

Inasmuch as the liquid naphtha is incapable of mixing with the mercury used for a sealing liquid, it is clear that with the aid of this invention all kinds of liquids, which will not mix with the mercury, can be measured.

What I claim, and desire to secure by Letters Patent, is—

A meter for oils or hydrocarbons consisting of the housing A, the internal rotary drum B within said housing, said drum being divided into chambers $b$ as described, the indicator shaft C connected with said drum, the inlet-pipe D and outlet-pipe $g$, all combined with a mercury sealing liquid filling the lower part of the casing A, and of the drum B, substantially as and for the purpose herein shown and described.

FRANCIS SHIPPEN.

Witnesses:
A. V. BRIESEN,
HARRY M. TURK.